United States Patent
Bensalem

(10) Patent No.: US 10,343,596 B2
(45) Date of Patent: Jul. 9, 2019

(54) TURN SIGNAL MODULATOR SYSTEMS AND METHODS

(71) Applicant: Toyota Motor Engineering & Manufacturing North America, Inc., Plano, TX (US)

(72) Inventor: Salem Bensalem, Erlanger, KY (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/721,661

(22) Filed: Sep. 29, 2017

(65) Prior Publication Data

US 2019/0100133 A1 Apr. 4, 2019

(51) Int. Cl.
*B60Q 1/34* (2006.01)
*B60Q 1/38* (2006.01)
B60T 17/22 (2006.01)

(52) U.S. Cl.
CPC ............ *B60Q 1/346* (2013.01); *B60Q 1/38* (2013.01); *B60Q 2900/30* (2013.01); *B60T 17/22* (2013.01)

(58) Field of Classification Search
CPC ...... B60Q 1/346; B60Q 1/38; B60Q 2900/30; B60T 17/22
See application file for complete search history.

(56) References Cited

U.S. PATENT DOCUMENTS

| | | | |
|---|---|---|---|
| 5,712,618 A | 1/1998 | McKenna | |
| 5,895,435 A * | 4/1999 | Ohta | F16H 61/0213 477/120 |
| 7,482,916 B2 | 1/2009 | Au | |
| 7,986,223 B2 | 7/2011 | Au | |
| 8,378,805 B2 | 2/2013 | Au | |
| 9,079,499 B1 | 7/2015 | Raubvogel | |
| 9,573,525 B2 | 2/2017 | Minikey | |
| 2008/0204212 A1* | 8/2008 | Jordan | B60Q 1/34 340/438 |

(Continued)

OTHER PUBLICATIONS

Automatic Vehicle Turn Signal; Making driving safer with an automatic turn signal that comes on when driver switches lanes; https://www.indiegogo.com/projects/automatic-vehicle-turn-signal-car-technology#/; INDIEGOGO; dated 2017.

*Primary Examiner* — Brian A Zimmerman
*Assistant Examiner* — Sara B Samson
(74) *Attorney, Agent, or Firm* — Sheppard, Mullin, Richter & Hampton LLP; Hector A. Agdeppa; Daniel N. Yannuzzi

(57) ABSTRACT

A turn signal modulation system is provided for controlling turn signals of a host vehicle. The turn signal modulation can include a vehicle braking sensor; a vehicle attitude sensor and a turn signal modulation circuit. The turn signal modulation circuit can include a communication receiver, communicatively coupled to receive information from the vehicle braking sensor and the vehicle attitude sensor; and a decision circuit with an input communicatively coupled to receive sensor information from the communication receiver. The sensor information can include information indicating an amount of braking force applied to the host vehicle and information indicating changes in vehicle attitude. The decision circuit may determine whether to actuate the turn signals using the amount of braking force applied to the host vehicle and the change in vehicle attitude.

14 Claims, 10 Drawing Sheets

(56) References Cited

U.S. PATENT DOCUMENTS

| | | | |
|---|---|---|---|
| 2009/0189756 A1 | 7/2009 | Wu | |
| 2010/0057299 A1* | 3/2010 | Burgdorf | B62D 15/021 |
| | | | 701/42 |
| 2012/0271510 A1* | 10/2012 | Seymour | B60Q 1/346 |
| | | | 701/36 |
| 2014/0309855 A1* | 10/2014 | Tran | B60Q 1/38 |
| | | | 701/36 |
| 2016/0068099 A1* | 3/2016 | Peterson | G01C 21/3658 |
| | | | 701/36 |
| 2017/0129497 A1* | 5/2017 | Zilberman | G06F 3/167 |

* cited by examiner

TURN SIGNAL MODULATOR SYSTEMS AND METHODS

TECHNICAL FIELD

The disclosed technology relates generally to automotive systems, and more particularly, some embodiments relate to automated turn signal activation in response to various conditions.

DESCRIPTION OF THE RELATED ART

Motor vehicle lighting systems often include headlights, taillights, site-marker lights running lights and turn signals. For vehicles operated on public motorways, minimum requirements and standards required for motor vehicle lighting systems are dictated by federal regulations and international treaties. For example, Articles 32 and 33 as well as Annex 5 of the Vienna Convention on Road Traffic set forth requirements for the use of vehicle lighting.

Motor vehicle lighting systems are intended not only to enable a driver to see better in dark conditions, but to alert other drivers as to the presence of the vehicle, its direction of travel, and possible changes in speed and direction of the vehicle. For example, a driver of a vehicle approaching another vehicle can determine whether the other vehicle is moving toward or away from him or her based on the color of the lights displayed on the other vehicle—i.e., whether they are red or white. Turn signals, for example, can be used to signal a driver's intentions to other drivers in the vicinity. For example, turn signals can be used to indicate that a driver intends to change lanes, turn a particular direction at an intersection or crossroad, turn into a driveway or parking lot, and so on. Turn signals can thus enhance the safety of the vehicle operating environment by allowing others to plan accordingly.

Unfortunately, drivers often fail to use their turn signals when making turns or changing lanes. In some instances, drivers simply make a conscious decision not to use their turn signals or they may forget to do so. In other instances, drivers of vehicles may be experiencing a medical condition or other impairment that incapacitates them or otherwise prevents them from enabling their turn signals as they unexpectedly veer into another lane, swerve off the road, or otherwise alter the direction of travel of the vehicle. Other vehicles in the vicinity such as, for example, vehicles following the subject vehicle, might be surprised by the subject vehicle's change of direction that occurred without advance warning from a turn signal.

BRIEF SUMMARY OF EMBODIMENTS

Embodiments of the technology disclosed herein are directed toward devices and methods for providing automatic turn signal modulation. More particularly, some embodiments of the technology disclosed herein relate to automatic turn signal actuation in the presence of certain identified vehicular conditions, which conditions may be detected and determined by vehicle sensors. For example, systems and methods can be implemented to provide automatic turn signal actuation upon the detection of an imminent lane departure, upon detection of a threshold degree of steering wheel rotation, and upon detection of a vehicle braking event.

For example, in some embodiments a turn signal modulation system for controlling turn signals of a host vehicle includes: a vehicle braking sensor ;a vehicle attitude sensor; and a turn signal modulation circuit. The turn signal modulation circuit may include, for example: a communication receiver, communicatively coupled to receive information from the vehicle braking sensor and the vehicle attitude sensor; a decision circuit comprising an input communicatively coupled to receive sensor information from the communication receiver, wherein the sensor information comprises information indicating an amount of braking force applied to the host vehicle and information indicating changes in vehicle attitude, and wherein the decision circuit is configured to determine whether to actuate the turn signals using the amount of braking force applied to the host vehicle and the change in vehicle attitude; and a transmitter communicatively coupled to send turn signal actuation instructions to the turn signal system.

The vehicle braking sensor make include, for example, a sensor to determine an amount of braking force is being applied to brakes of the vehicle, or an accelerometer to determine a magnitude of deceleration experienced by the host vehicle. The vehicle attitude sensor may include a steering input sensor to detect an amount of steering input being applied by a driver of the host vehicle, or an accelerometer to detect a change in yaw of the vehicle. The steering input sensor may include a rotational encoder.

In another embodiment, a method for turn signal modulation may include: a plurality of vehicle sensors sensing information about a vehicle and transmitting that information to a turn signal modulation circuit; the turn signal modulation circuit receiving information from the vehicle sensors; the turn signal modulation circuit determining whether brakes of the vehicle are being applied above a threshold amount of brake application; the turn signal modulation circuit determining whether a vehicle attitude change is greater than a determined threshold; and if the brakes of the vehicle are being applied above a threshold braking amount, and vehicle attitude change is greater than a determined attitude threshold, the turn signal modulation circuit transmitting a signal to a turn signal system of the vehicle to activate the turn signals.

Determining whether a vehicle attitude change is greater than a determined threshold may include determining whether the vehicle steering wheel is rotated greater than a threshold amount. Determining whether a vehicle attitude change is greater than a determined threshold comprises determining whether the vehicle is undergoing a yaw event by a degree of yaw greater than a threshold amount.

In yet another embodiment, a method for turn signal modulation, may include: a plurality of vehicle sensors sensing information about a vehicle and transmitting that information to a turn signal modulation circuit; the turn signal modulation circuit receiving information from the vehicle sensors; the turn signal modulation circuit determining whether the vehicle is in a turn lane of an intersection using sensor information received from the vehicle sensors; the turn signal modulation circuit activating turn signals of the vehicle if the vehicle is in a turn lane of the intersection; and if the brakes of the vehicle are being applied above a threshold braking amount, and vehicle attitude change is greater than a determined attitude threshold, the turn signal modulation circuit transmitting a signal to a turn signal system of the vehicle to activate the turn signals.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing automatic turn signal modulation. More particularly, some embodiments of the technology disclosed herein relate to automatic turn signal actuation in the presence of certain identified vehicular conditions, which conditions may be detected and determined by vehicle sensors. For example, systems and methods can be implemented to provide automatic turn signal actuation upon the detection of an imminent lane departure, upon detection of a threshold degree of steering wheel rotation, and upon detection of a vehicle braking event.

Before describing the technology in detail, it is useful to describe an example vehicle with which the technology may be implemented. Although the example described herein is a hybrid type of vehicle as shown in FIG. 1, the systems and methods for automatic turn signal actuation can be implemented in other types of vehicle including gasoline- or diesel-powered vehicles, fuel-cell vehicles, electric vehicles, or other suitably powered vehicles.

Figure 1:
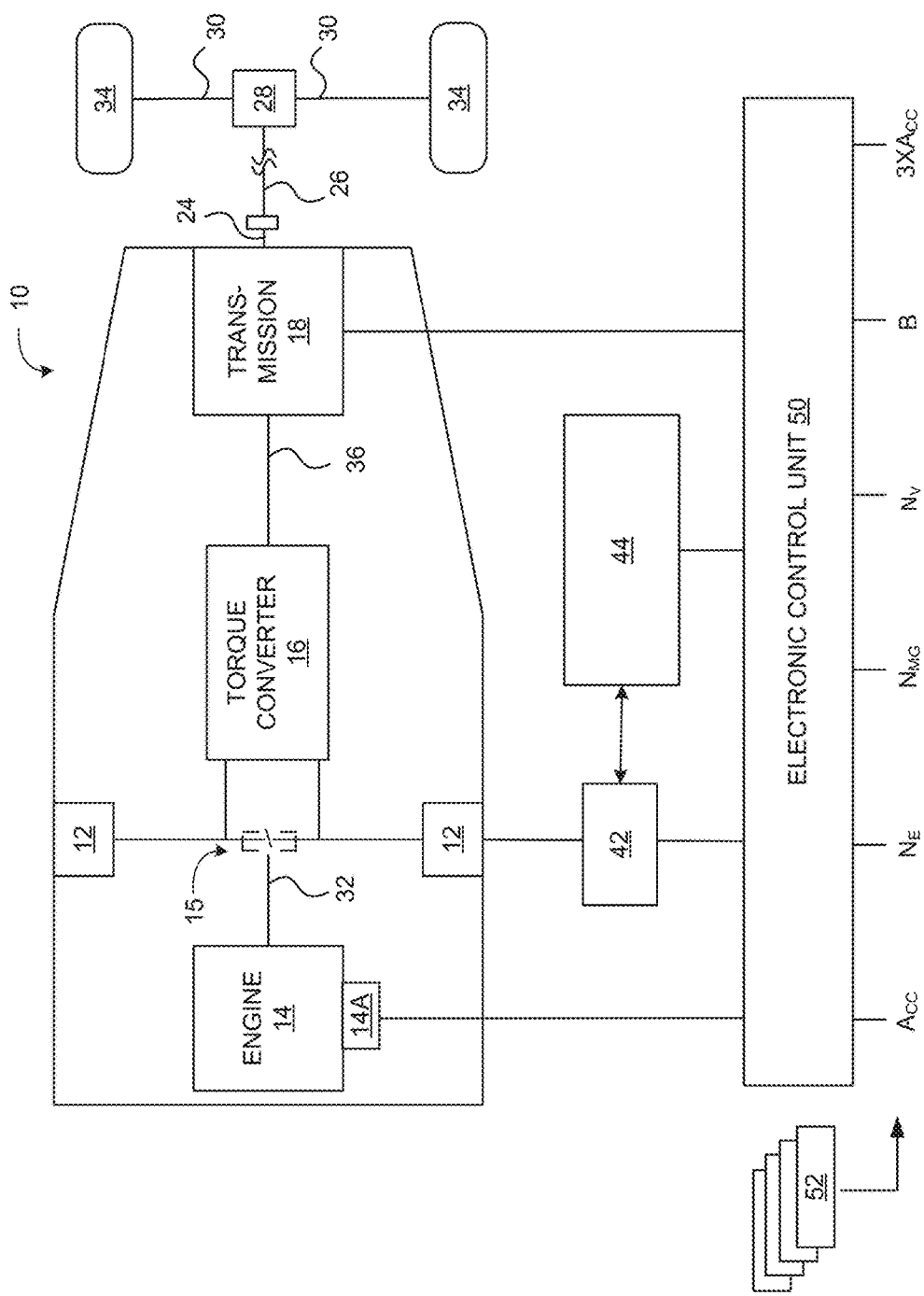
FIG. 1 illustrates an example of a vehicle with which systems and methods for automatic turn signal modulation be implemented in accordance with one embodiment of the systems and methods described herein.

FIG. 1 illustrates an example of a vehicle with which systems and methods for automatic turn signal actuation be implemented. The example illustrated in FIG. 1 is that of a hybrid vehicle a drive system of a vehicle 10 that may include an internal combustion engine 14 and one or more electric motors 12 as sources of motive power. Driving force generated by the internal combustion engine 14 and motors 12 can be transmitted to one or more wheels 34 via a torque converter 16, a transmission 18, a differential gear device 28, and a pair of axles 30.

As a hybrid vehicle, vehicle 10 may be driven/powered with either or both of engine 14 and the motor(s) 12 as the drive source for travel. For example, a first travel mode may be an engine-only travel mode that only uses the internal combustion engine 14 as the drive source for travel. A second travel mode may be an EV travel mode that only uses the motor(s) 12 as the drive source for travel. A third travel mode may be an HEV hybrid travel mode that uses engine 14 and the motor(s) 12 as drive sources for travel. In the engine-only and HEV travel modes, hybrid vehicle 10 relies on the motive force generated at least by internal combustion engine 14 and a clutch 15 may be included to engage engine 14. In the EV travel mode, hybrid vehicle 10 is powered by the motive force generated by motors 12 while engine 14 may be stopped and clutch 15 disengaged.

Engine 14 can be an internal combustion engine such as a gasoline, diesel or similarly powered engine in which fuel is injected into and combusted in a combustion chamber. An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motors 12 can also be used to provide motive power in vehicle 10, and is powered electrically via a power storage device 44. Motors 12 can be powered by power storage device 44 to generate a motive force to move the vehicle and adjust vehicle speed. Motors 12 can also function as a generator to generate electrical power such as, for example, when coasting or braking. Power storage device 44 may also be used to power other electrical or electronic systems in the vehicle. Motors 12 may be connected to power storage device 44 via an inverter 42. Power storage device 44 can include, for example, one or more batteries, capacitive storage units, or other storage reservoirs suitable for storing electrical energy that can be used to power one or more motors 12. When power storage device 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motors and adjust the current received from motors 12 during regenerative coasting and breaking. As a more particular example, output torque of the motors 12 can be increased or decreased by electronic control unit 50 through the inverter 42.

A torque converter 16 can be included to control the application of power from engine 14 and motors 12 to transmission 18. Torque converter 16 can include a viscous coupling the transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motors 12 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

Vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 10. For example, electronic control unit 50 may receive signals that indicate an accelerator operation amount, $A_{CC}$, a revolution speed, $N_E$, of engine 14 (engine RPM), a rotational speed, $N_{MG}$, of the motors 12 (motor rotational speed), a vehicle speed, $N_V$, and energy storage amount, E, indicating (remaining capacity, charged amount for power storage device 44). Accordingly, vehicle 10 can include a plurality of sensors 52 they can be used to detect various conditions internal or external to the vehicle and provide sensed conditions to electronic control unit 50 (which, again, may be implemented as one or a plurality of individual control circuits). In one embodiment, sensors 52 may be included to detect one or more conditions such as, for example, vehicle speed and changes in speed, vehicle attitude (i.e., roll pitch and yaw), vehicle braking, steering wheel angle and rotation (and speed of rotation), driver alertness, and so on.

A further example of a sensor 52 may be a 3-axis accelerometer to detect vehicle dynamics. One or more 3-axis accelerometers can be used, for example, to determine acceleration of vehicle 10, as well as, for example, the vehicle attitude (i.e., roll, pitch and yaw experienced by the vehicle). In accordance with various embodiments, acceleration/deceleration information from the 3-axis accelerometers may be sent to electronic control unit 50 so that electronic control unit 50 may calculate acceleration, deceleration, attitude, or other vehicle parameters based on acceleration/deceleration data from the accelerometers. This rate of acceleration or deceleration can be used, for example, when determining whether to actuate a turn signal in accordance with various embodiments described below.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In yet further embodiments, hybrid sensors may be included that provide a combination of raw data and processed data to electronic control unit 50. Sensor 52 may provide an analog output or a digital output.

Sensors 52 may be included to detect not only vehicle conditions but also to detect external conditions as well. Sensors that might be used to detect external conditions can include, for example, environmental sensors such as temperature, humidity and precipitation sensors. Another example of sensors that detect external conditions can include sonar, radar, lidar or other vehicle proximity sensors and cameras or other image sensors. Vehicle proximity sensors may be used to detect, for example, the proximity of the subject vehicle to other objects such as vehicles or barriers. Image sensors can be used to detect, for example, the presence of lanes (e.g. by detecting lines in the road, curbing, medians, etc.), traffic signs, road curvature, obstacles, and so on. While some sensors can be used to actively detect passive environmental objects, other sensors can be included and used to detect active objects such as those objects used to implement smart roadways that may actively transmit data or other information.

Figure 2:
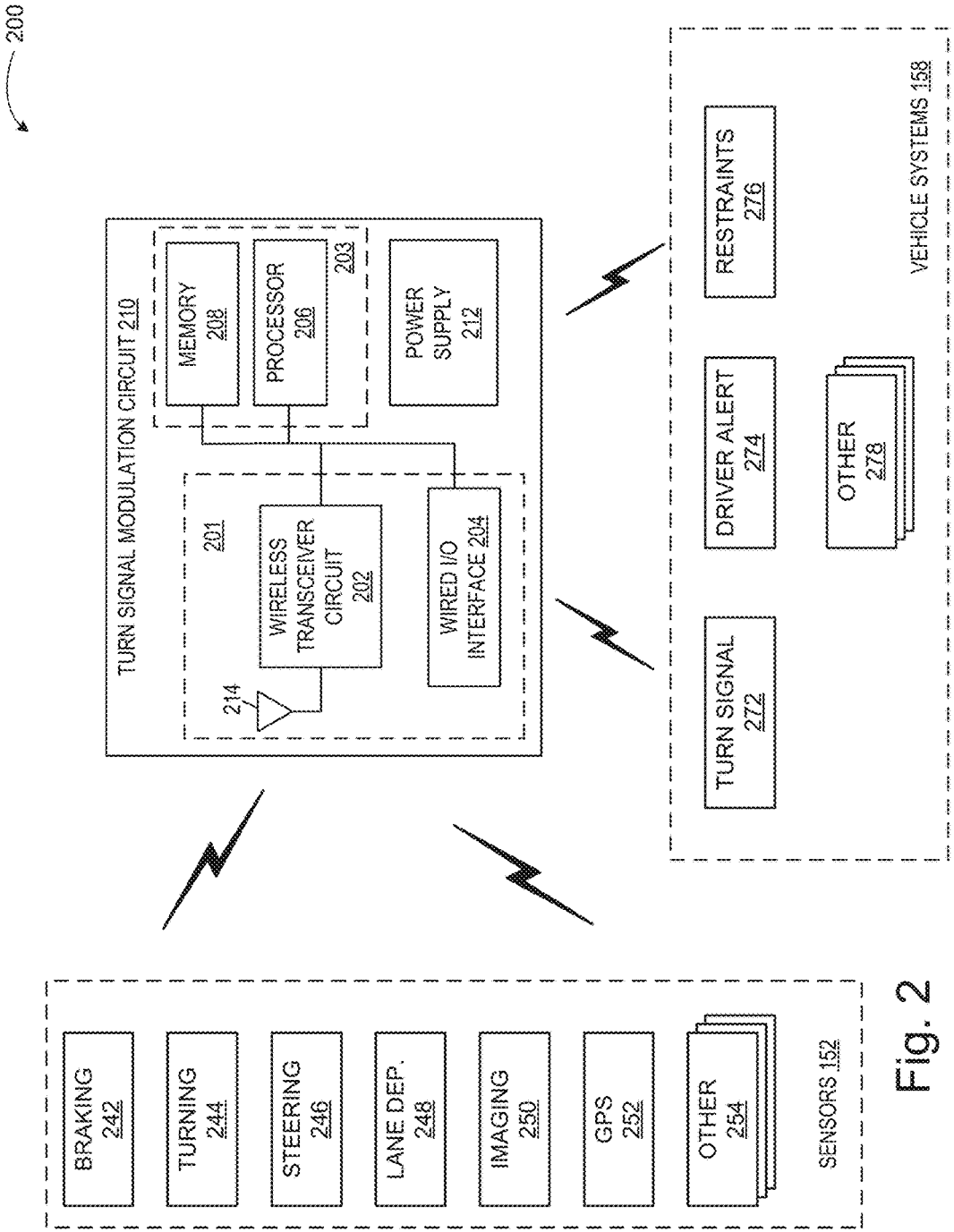
FIG. 2 illustrates an example architecture for automatic turn signal modulation in accordance with one embodiment of the systems and methods described herein.

FIG. 2 is a diagram illustrating an example of a turn signal modulation system in accordance with one embodiment of the systems and methods described herein. Referring now to FIG. 2, in this example, turn signal modulation system 200 includes a turn signal modulation circuit 210, a plurality of sensors 152, and a plurality of vehicle systems 158. Sensors 152 and vehicle systems 158 can communicate with turn signal modulation circuit 210 via a wired or wireless communication interface. Although sensors 152 and vehicle systems 158 are depicted as communicating with turn signal modulation circuit 210, they can also communicate with each other as well as with other vehicle systems. Turn signal modulation circuit 210 can be implemented as an ECU or as part of an ECU such as, for example electronic control unit 50.

Turn signal modulation circuit 210 in this example includes a communication circuit 201, a decision circuit (including a processor 206 and memory 208 in this example) and a power supply 212. Components of turn signal modulation circuit 210 are illustrated as communicating with each other via a data bus, although other communication in interfaces can be included.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to turn signal modulation circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a turn signal modulation circuit 210.

Communication circuit 201 either or both a wireless transceiver circuit 202 with an associated antenna 214 and a wired I/O interface 204 with an associated hardwired data port (not illustrated). As this example illustrates, communications with turn signal modulation circuit 210 can include either or both wired and wireless communications. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by turn signal modulation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Communication circuit 201 can be used to transmit and receive information between turn signal modulation circuit 210 and sensors 152, and turn signal modulation circuit 210 and vehicle systems 158. For example, communication circuit 201 can be configured to receive data and other information from sensors 152 that is used in determining whether to activate the turn signals. Additionally, communication circuit 201 can be used to send an activation signal or other activation information to vehicle turn signal system 272 to activate the turn signals. Likewise, information to actuate driver alerts, safety restraint systems, and other systems can be sent by turn signal modulation circuit 210 to vehicle systems 158 using communication circuit 201.

Power supply 212 can include one or more of a battery or batteries (such as, e.g., Li-ion, Li-Polymer, NiMH, NiCd, NiZn, $NiH_2$, rechargeable, primary battery, etc.), a power connector (e.g., to connect to vehicle supplied power, etc.), an energy harvester (e.g., solar cells, piezoelectric system, etc.), or include any other suitable power supply.

Sensors 152 can include, for example, sensors 52 such as those described above with reference to the example of FIG. 1. Sensors 52 can include additional sensors that may or not otherwise be included on a standard vehicle 10 with which the turn signal modulation system 200 is implemented. In the illustrated example, sensors 152 include braking sensors 242, turning sensors 244, steering sensors 246, Lane departure sensors 248, imaging systems 250 (e.g., one or more cameras), and a GPS navigation system 252. Additional sensors 254 can also be included as may be appropriate for a given implementation of turn signal modulation system 200.

Braking sensors 242 can include, for example, sensors to provide data indicating whether vehicle brakes are applied, the force of braking or amount of braking, whether in antilock braking system or other like braking system is activated during vehicle braking, and other like braking events. In some embodiments, the amount of braking can indicate the severity of an upcoming turn, for example. The syndication could be made independently based on braking sensor data alone, or the severity of the turn might be determined by breaking sensor data in combination with other data such as, for example, GPS navigation system data (e.g., indicating upcoming intersections), image sensor data (e.g., indicating an upcoming intersection via visual cues), smart roadway data (e.g., receiving information from a smart roadway transponder indicating an upcoming intersection), and so on. Accelerometers may also be included to indicate that the amount of acceleration or deceleration to turn signal modulation circuit 210.

Turning sensors 244 can include, for example, one or more accelerometers (e.g., single-, two- or three-axis accelerometers) to indicate a vehicle yaw event such as the host vehicle turning, swerving or otherwise changing direction. Accelerometers can also be used to indicate acceleration/deceleration in a number of different axes and can provide this information to turn signal modulation circuit 210.

Steering sensors 246 can be used to provide data indicating a direction and an amount of steering input made by a driver operating the host vehicle. For example, rotary coders can be included (e.g., at the steering column) to indicate steering wheel angle and rate of change and direction of change of the steering wheel angle. Torque sensors, servo systems, accelerometers, and other like sensors can also be used to detect steering events for the host vehicle steering system. In electronic drive-by-wire steering systems, data from the steering control system itself can be used.

Lane departure sensors 248 can also be included to detect events such as, for example, a vehicle moving toward the outer limits of a given lane, crossing into a new lane, crossing into an oncoming lane, or crossing into the shoulder. Such detection can be made via one or more cameras such as in the case of the Toyota Safety Sense™ system. Lane departure sensors can be mounted using video sensors, laser sensors, infrared sensors, and other detection systems that can detect whether the vehicle is about to move out of its lane. Lane departure sensors may use, for example, Hough transforms and Canny edge detection to detect lane lines from image data received by a camera, although other Lane departure sensors may be used.

Imaging systems 250 can also be included to provide sensor type of information to turn signal modulation circuit 210. Imaging systems 250 can include image detectors to detect upcoming road characteristics. For example, optical or infrared image sensors coupled with image detection circuitry can detect upcoming curves in the roadway, road signs and intersections that the vehicle is approaching.

GPS 252 can include global positioning system and other navigation systems to detect vehicle parameters such as, for example, vehicle position, vehicle speed, vehicle direction of travel, and so on. GPS 252 can also provide information to turn signal modulation circuit 210 regarding parameters of the road on which the vehicle is traveling and parameters about the environment that the vehicle is approaching. For example, GPS 252 can provide information regarding the number of lanes of the road upon which the host vehicle is traveling, whether the host vehicle is approaching an intersection, possible directions of travel at the intersection, whether there are curves in the road ahead, whether those curves are to the right or to the left and whether they are sharp or gentle, and so on. This information, and other sensor information, can be used by turn signal modulation circuit 210 to determine whether to actuate the turn signals in the event the driver of the host vehicle fails to do so.

In the example illustrated in FIG. 2, vehicle systems 158 include turn signal systems 272, driver alert systems 274, safety restraints 276, and other host vehicle systems 278. Turn signal systems 272 can include, for example, vehicle turning indications signals (sometimes colloquially referred to as blinkers), and control systems that control the actuation of the turn signals. Driver alert systems 274 may include, for example, audible, visual or tactile feedback systems to the driver to alert the driver of events or conditions. For example, driver alert systems 274 may be used to alert the driver that turn signal modulation circuit 210 has activated and taken a particular action such as, for example, activating a right or left turn signal. As another example, driver alert systems 274 may also be used to awaken a dozing driver or notify a dozing driver that he or she is nodding off.

Safety restraints 276 may include active controls for restraint systems that can be activated or preconditioned in the event that turn signal modulation circuit 210 detects conditions that could indicate a safety risk. For example this may include activating seatbelt pre-tensioners, or taking other steps to prepare restraint systems for a crash or like event. Other vehicle systems 278 that may be controlled or actuated by turn signal modulation circuit 210 may also include, for example, automated vehicle braking systems, active vehicle lane control systems, dynamic stability control systems, or other like safety systems. Another example of other vehicle systems 278 can include, for example, vehicle-to-vehicle communication systems, emergency transponder systems, to name a few.

FIGS. 3, 4, 5 and 6 are diagrams illustrating examples of different host-vehicle environment conditions that may be detected by host vehicle systems (e.g. by sensors 52) and used by the systems and methods for determining whether to actuate the host-vehicle turn signals. Embodiments of the systems and methods for turn signal actuation are described below with reference to these example environments in which the host vehicle may operate. After reading this description, one of ordinary skill in the art will understand how systems and methods for automatic turn signal actuation may be implemented in other vehicle environments. Particularly, these examples show how environmental cues and sensor information can be used by a turn signal actuation system (e.g. turn signal modulation system 200) to determine whether to activate the host-vehicle turn signals.

Figure 3:
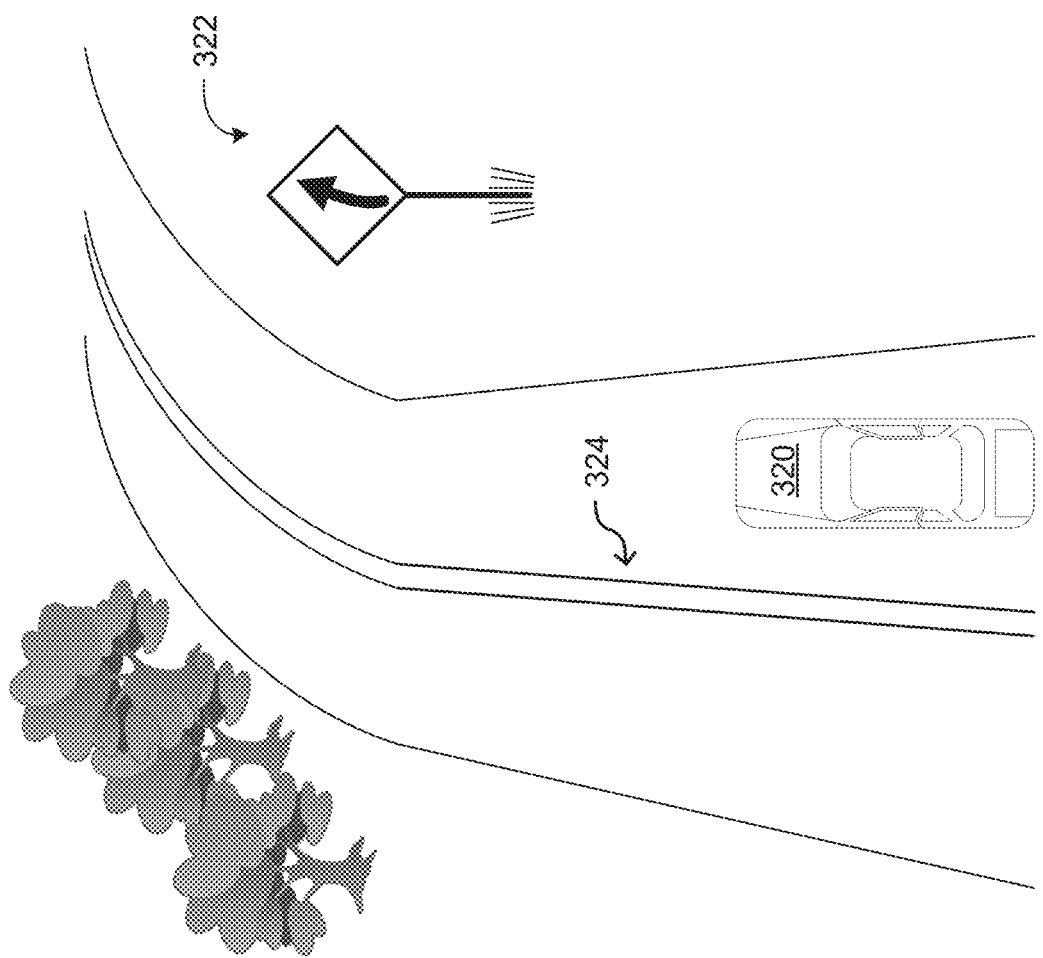
FIG. 3 illustrates an example scenario in which a host vehicle is approaching a slight bend in the road on which it is traveling.

FIG. 3 illustrates an example scenario in which a host vehicle 320 is approaching a slight bend in the road on which it is traveling. In the example of FIG. 3, the bend in the road is slight enough that it is anticipated that the driver would not need to apply the host vehicle brakes, or would only need to apply the brakes very lightly, to negotiate the curve. As this example also illustrates, there is a road sign 322 indicating the slight bend in the road, in a double yellow line 324 that continues through the curve. In this example, there are no intersections, crosswalks, traffic lights, or other indications that the vehicle is approaching an intersection. Also, the double yellow line in the absence of dotted lines indicate that there are no options for the driver to change lanes on this road.

Figure 4:
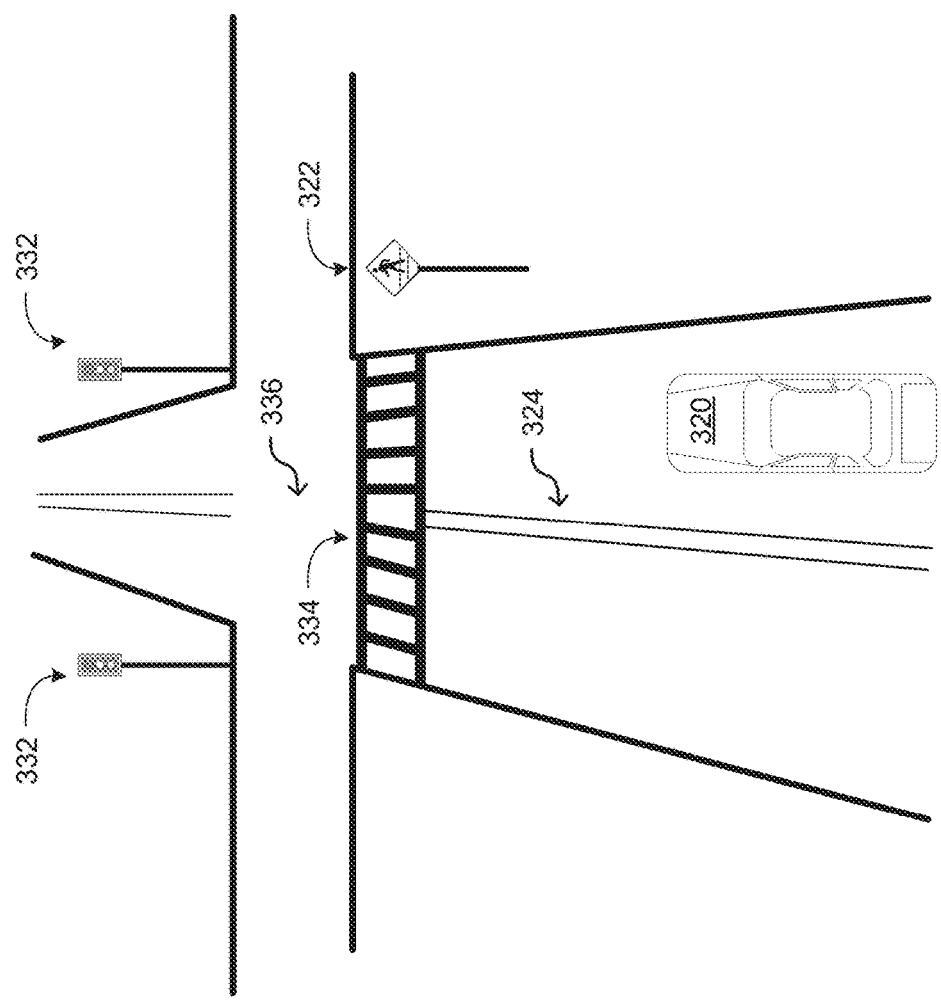
FIG. 4 illustrates an example scenario in which a host vehicle is approaching an intersection.
Figure 5:
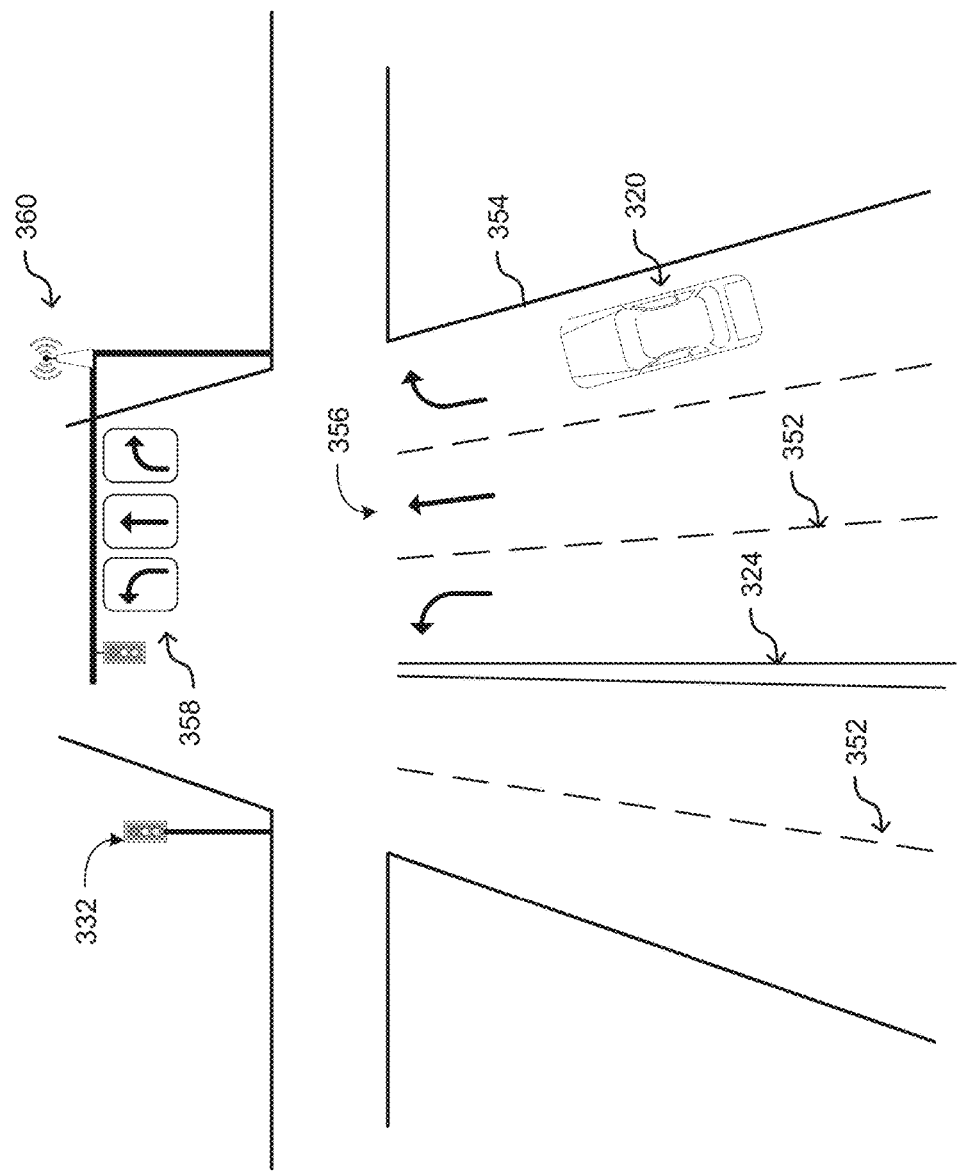
FIG. 5 illustrates another example scenario in which a host vehicle is approaching an intersection.

FIG. 4 illustrates an example scenario in which a host vehicle 320 is approaching an intersection. In the example of FIG. 4, this environment includes traffic signals 332, a crosswalk 334, a break in the double yellow lines 336, and a road sign 322 indicating the presence of a pedestrian crosswalk. FIG. 5 illustrates another example scenario in which a host vehicle 320 is approaching an intersection. In the example of FIG. 5, the road on which the vehicle is traveling is a multilane road, wherein each lane is separated by dashed lines 352. In this example, there are three lanes in the direction of travel of host vehicle 320 approaching the intersection: a left turn lane, a through lane, and a right turn lane. The lanes are marked by lane markings 356 and separated by dashed lines 352. They are separated from oncoming lanes by double yellow line 324 and bordered by curbing 354. This example also includes traffic signals 332, lane-indication signs 358, and a wireless transponder 360. Wireless transponder can include a transmitter and may also include a receiver so that it can communicate with vehicles approaching the intersection such as host vehicle 320. In one embodiment, wireless transponder 360 is part of a smart roadway and is configured to transmit information to the vehicle about the intersection in the roadway on which it is traveling. This can include, for example, the fact that the vehicle is approaching an intersection, that the intersection has three lanes, the current condition of traffic signal 332, and that the vehicle is in the right most of the three lanes, which is a right turn lane. Host vehicle 320 can likewise be configured to transmit information to wireless transponder 360, such as vehicle speed, state of vehicle systems, the lane in which the vehicle is traveling and so on. Although not illustrated, additional infrastructure elements can be provided for a smart roadway, such as, for example, in-road sensors and transponders to further detect the presence and activity of vehicles on the road and to communicate conditions about the road and other vehicles to the vehicles traveling on the road.

Figure 6:
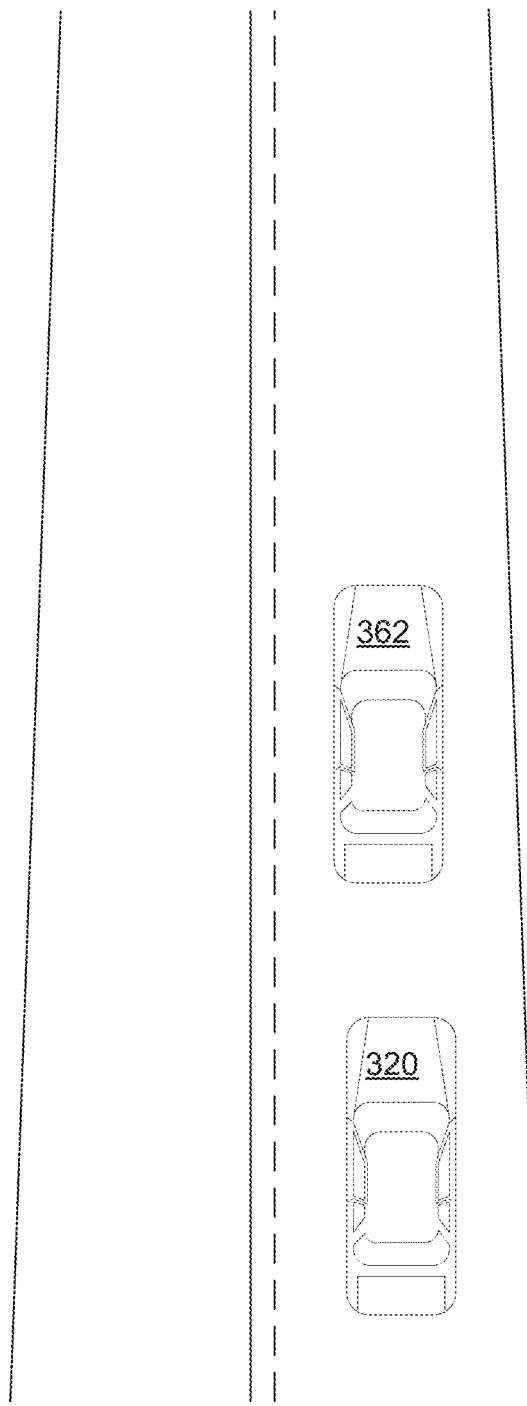
FIG. 6 illustrates an example scenario in which host vehicle is approaching another vehicle on a road on which passing is permitted.

FIG. 6 illustrates an example scenario in which host vehicle 320 is approaching another vehicle 362 on a road on which passing is permitted. In this example, host vehicle 320 is traveling faster than vehicle 362. Information as to the relative speed of the vehicles can be provided to turn signal modulation circuit 210 of host vehicle 320 via sensors 52. For example, V2V communications can be used to determine the rate of speed of vehicle 362, which can be compared to the speed of host vehicle 320. As another example, forward looking radar, lidar or other like systems can be used to detect the rate at which host vehicle 320 is gaining on the other vehicle 362. This information can be used to determine whether the left turn signal should be actuated to indicate passing. In some embodiments, additional information can be used in making this determination. For example, the additional information can include throttle position of host vehicle 320 (i.e., is the driver making input to accelerate or decelerate the vehicle 320 as he/she approaches vehicle 362), vehicle speed information (e.g., is the vehicle accelerating or decelerating), whether the vehicle 320 in a passing lane, whether there is oncoming traffic, and so on.

Figure 7:
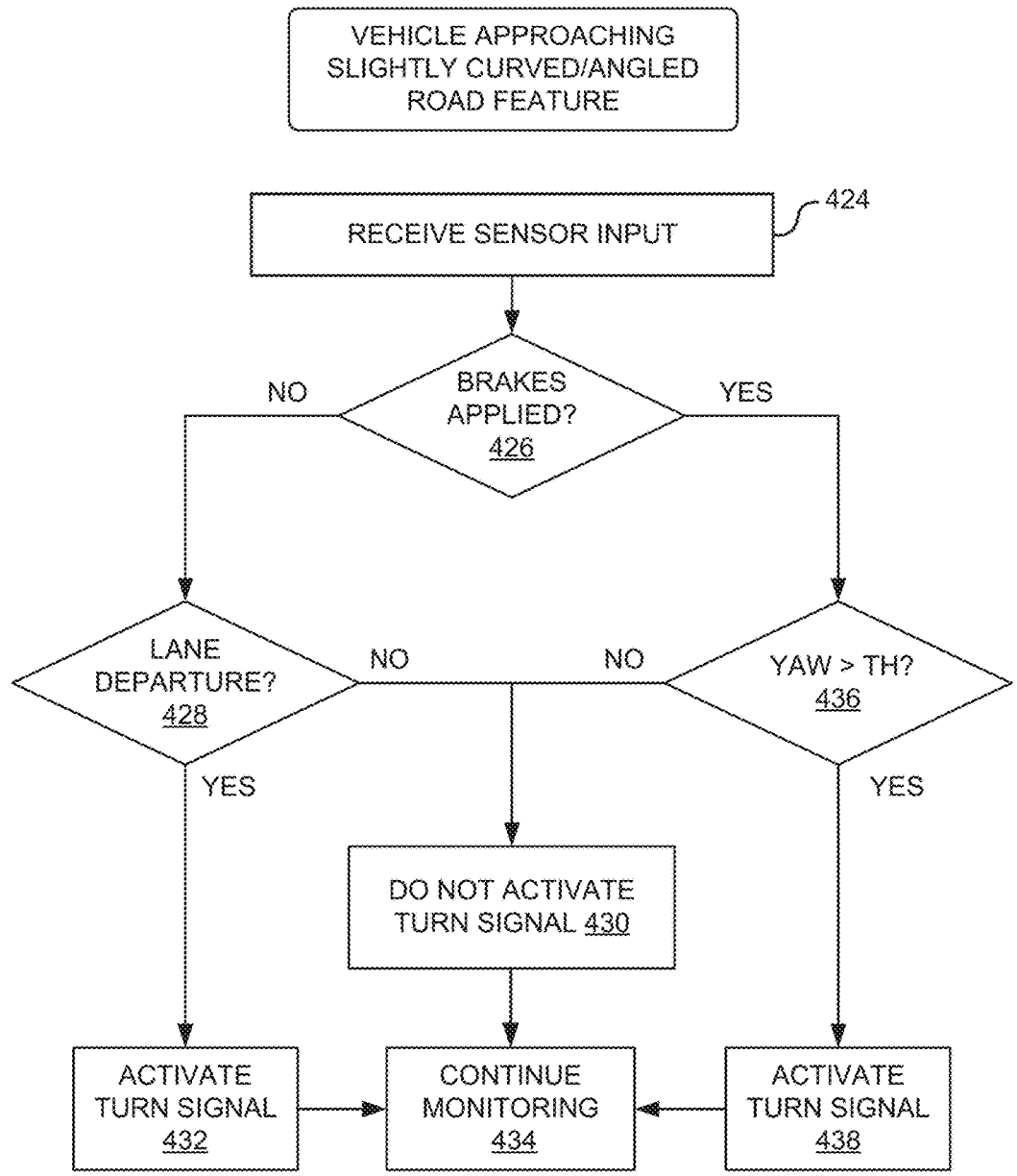
FIG. 7 illustrates an example process for automatic turn signal modulation in accordance with one embodiment of the systems and methods described herein.

FIG. 7 illustrates an example process for automatic turn signal modulation in accordance with one embodiment of the systems and methods described herein. In this example scenario, the system determines whether vehicle is approaching a slightly curved/angled road feature such as the example illustrated in FIG. 3, or an intersection such as that illustrated in FIGS. 4 and 5. Referring now to FIG. 7, at operation 424, the turn signal modulation circuit receives sensor input from one or more sensors. At operation 426, the system determines whether the brakes of the host vehicle are applied. This can be determined based on, for example, brake sensors (e.g., braking sensors 242), and velocity sensors (e.g., vehicle's speedometer information, or GPS information, etc.). If the brakes are not applied, or if they are applied below a threshold braking amount (as indicated by a NO at operation 426), this would generally indicate that a turning event is not occurring.

However, there may still be a lane departure event. Therefore, sensor information can be used to determine at operation 428 whether the vehicle is changing lanes. For example, cameras or other image sensors can detect whether the vehicle is crossing the line on the road to determine whether a lane departure event is occurring. If no lane departure event is occurring (as indicated by a NO at operation 428), at operation 430 the turn signals are not activated. If, on the other hand, a lane departure event is occurring (as indicated by a YES at operation 428) at operation 432 the turn signal is activated. Either the right or the left turn signal may be activated depending on whether the vehicle is crossing the lane demarcation lines to the right or left of the vehicle. Then, at operation 434, the system continues to monitor sensor information.

Returning to operation 426, if the brakes are applied (or applied above a threshold braking amount), the system can then check to determine whether the vehicle is turning by greater than a threshold amount. This can be determined, for example, based on steering input steering input, which can be determined using information from steering wheel encoders or other steering sensors. As another example, it may be determined based on accelerometer information indicating a rotation about the vehicle z-axis.

If the vehicle is turning by less than the threshold amount (as indicated by a NO at 436), the turn signals are not activated 430. If, on the other hand, the vehicle is turning by greater than a threshold amount the turn signals are activated at operation 438. Then, the system may continue monitoring sensors as illustrated by operation 434. In addition to a change in vehicle direction other information can be used to confirm that a turn signal event is occurring such that the turn signal should be activated. As one example, map data from a GPS system may indicate that the vehicle is at or approaching an intersection. As another example, sensor information from sensors detecting road signs or other indication that the vehicle is at an intersection can be used as well.

Therefore, the occurrence of a braking event and a change in vehicle attitude about the z axis in the presence of an intersection may indicate to the system (e.g., turn signal modulation circuit 210) that the vehicle is turning and a turn signal should be activated. Although not illustrated, the system can also first determine whether the driver has manually activated a turn signal, in which case, the system need not engage in automatic activation.

In some embodiments, additional information can be used to determine whether or not to activate turn signals. Consider again the example of FIG. 3, in which the vehicle is approaching a gentle bend in the road and there is only a single lane in the direction of travel. In the embodiment described with reference to FIG. 7, and in other embodiments, when the system determines based on sensor input that the vehicle is approaching a slightly curved or angled road feature, it can decline to activate the turn signals. Determination of the vehicle is approaching a slightly curved road feature can be made, for example, based on input from sensors such as cameras or other imaging sensors (e.g., imaging systems 250 in the example of FIG. 2), input from a GPS system identifying upcoming road features (e.g., GPS 252 in FIG. 2), data received from wireless transponders on a smart roadway, or other sensor input.

Figure 8:
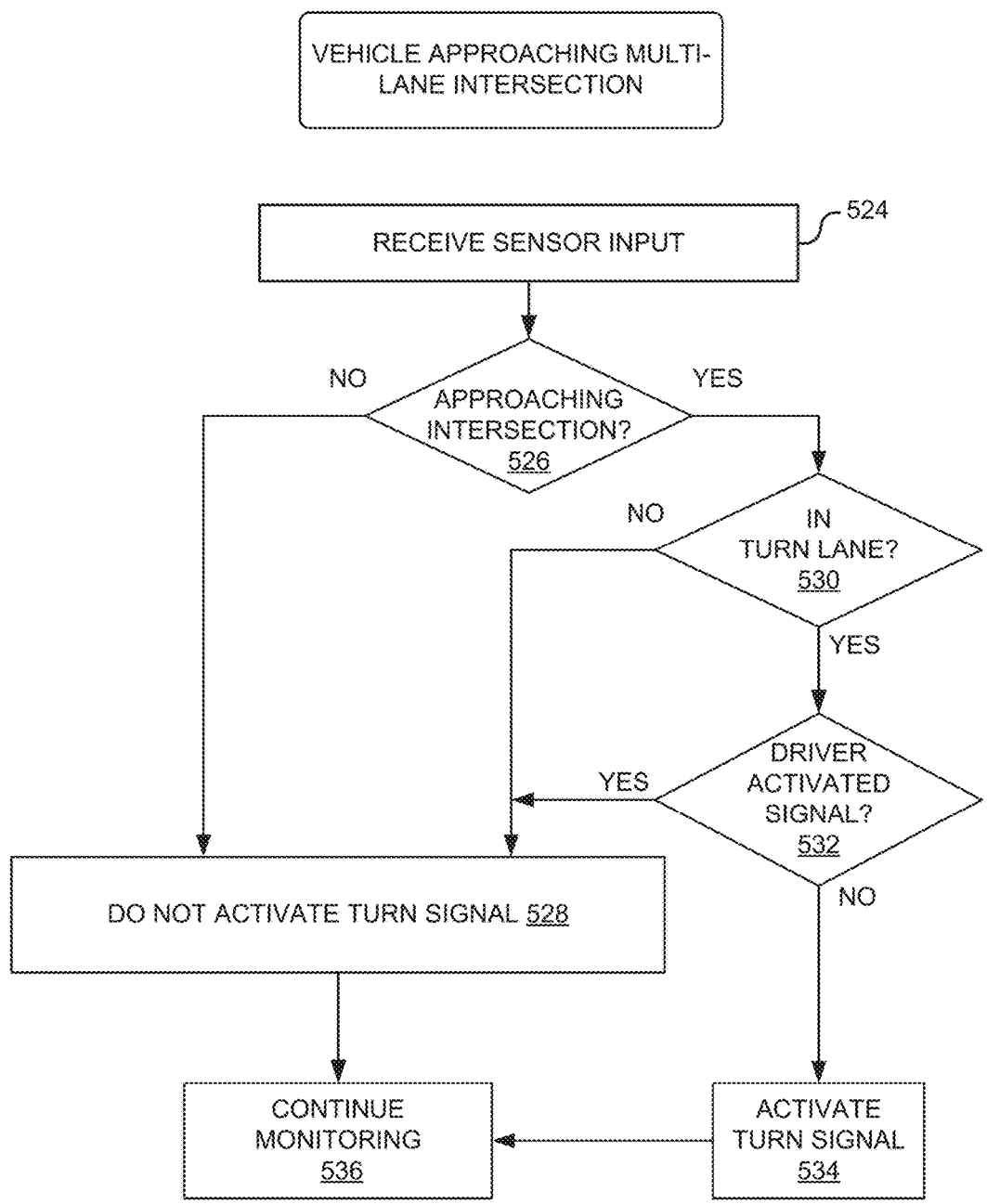
FIG. 8 is a diagram illustrating another example process for automatic turn signal actuation in accordance with one embodiment of the systems and methods described herein.

FIG. 8 is a diagram illustrating another example process for automatic turn signal modulation in accordance with one embodiment of the systems and methods described herein. This illustrates the process for an example embodiment that can be used to determine whether to actuate turn signals when the vehicle is approaching a multilane intersection. An example of such a multilane intersection is illustrated at FIG. 6.

At operation 524, turn signal actuation circuit (e.g., turn signal modulation circuit 210) receives sensor input. The sensor input can include input from one or more of a plurality of sensors. For example, the system can receive lane information from camera systems and smart road transponders. As another example, the system can receive information indicating that the vehicle is approaching an intersection.

At operation 526, the system determines whether the vehicle is approaching an intersection. As previously described, this can be determined, for example, by determining whether the vehicle is approaching a crosswalk, whether across lanes, whether traffic signals are present, whether road signs indicate the presence of an intersection, whether smart-highway transponders indicate the presence of an intersection, and so on.

If the vehicle is not approaching an intersection (as indicated by a NO at operation 526), and there are no other turn events detected, the turn signals are not activated as illustrated by operation 528. In this event, the system continues monitoring sensor input as illustrated at 536.

However, if the vehicle is approaching an intersection (as indicated by a YES at operation 526), the system can determine whether the vehicle is in a turn lane. This can be accomplished, for example, using lane characteristic information. Lane characteristic information can be determined from camera sensors detecting, for example, lane markings and lane indication signs (e.g. lane markings 356, and signs 358 in FIG. 5), smart road transponders (e.g., wireless transponder 360), and other information. This information can be used to determine whether the vehicle is in a turn lane, whether the turn lane is a left-turn lane or a right-turn lane, or whether the vehicle is in a through lane.

If the vehicle is not in the turn lane (as indicated by a NO at operation 530), the system does not activate the turn signals at operation 528, and continues monitoring at operation 536. If one the other hand, the vehicle is in a turn lane (as indicated by a YES at operation 530) the vehicle determines whether the driver activated the turn signals. This is indicated by operation 532. If the driver already activated the turn signals, there is no need for the system to do so and accordingly the process can proceed to operation 528 where the turn signals are not activated by the system. Again, the system continues monitoring the sensors at operation 536. If, on the other hand, the driver has not activated the signal at operation 532 but the vehicle is in a turn lane, the system determines whether the vehicle is in a right-turn lane or a left-turn lane and activates the appropriate left or right turn signal at operation 534. At operation 536, the system continues monitoring sensor input.

Figure 9:
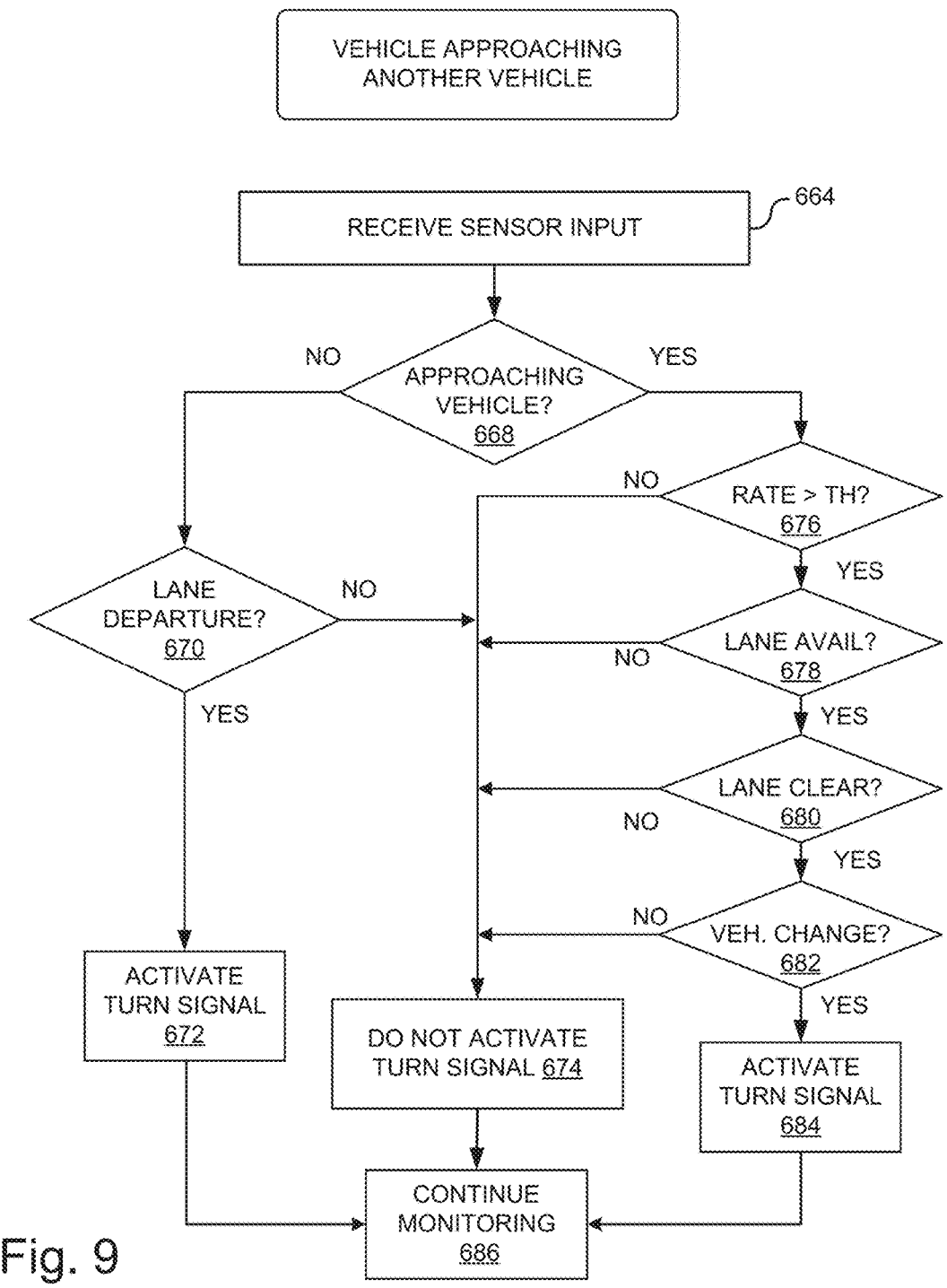
FIG. 9 is a diagram illustrating another example process for automatic turn signal actuation in accordance with one embodiment of the systems and methods described herein.

FIG. 9 is a diagram illustrating another example process for automatic turn signal actuation in accordance with one embodiment of the systems and methods described herein. The example in FIG. 9 describes an embodiment for automatic turn signal actuation in a scenario where the host vehicle is approaching another vehicle. At operation 664, the system receives sensor input (e.g., turn signal modulation circuit 210 receives input from sensors 152).

At operation 668, the system determines whether the host vehicle is approaching another vehicle from behind. This can be determined, for example, based on radar, lidar, or other like systems on host vehicle, V2V communications between the vehicles, or other sensor input information. If the vehicle is not approaching or closing on the vehicle in front of it, the system can determine not to activate the turn signals. However, in the illustrated embodiment, the system first determines whether a lane departure event is occurring as illustrated at operation 670. An example of this is described with reference to FIG. 7 at operation 428.

If a lane departure event is not occurring, the turn signals are not activated as illustrated by operation 674. If, on the other hand, a lane departure event is occurring, the system can activate the turn signals as illustrated at operation 672. In either case, the system can continue monitoring sensors as illustrated by operation 686.

Referring back to operation 668, if the host vehicle is approaching another vehicle, additional sensor information can be gathered to determine whether the turn signal should be activated. In this example embodiment, the system evaluates sensor information to determine whether a passing event is occurring or is likely to occur. In the example illustrated in FIG. 9, this is determined based on four factors. These are illustrated at operation's 676, 678, 680 and 682. In various embodiments, any or all of these factors can be used to determine whether a passing event there is occurring or is likely to occur. Likewise, additional sensor input can be used as well.

At operation 676, the system determines whether the host vehicle is approaching the other vehicle and closing at a rate greater than a threshold rate. The system may also look at acceleration or deceleration information, throttle information, breaking information and other information to determine whether the driver is intending to pass the other vehicle.

At operation 678, the system can further determine whether there is a passing lane available. For example, the system might consult map data or might use camera information to determine the presence of a dashed line indicating the availability of a passing lane. If there is a passing lane, at operation 680, the system can also determine whether that passing lane is clear, or whether there are oncoming vehicles. For example, sensor information (e.g., radar, lidar, etc.) V2V information and so on might be used to determine whether there is an oncoming car in the passing lane or whether the passing lane is otherwise blocked to prohibit passing.

At operation 682, the system determines whether there is a change in vehicle position or attitude. For example, the system can use accelerometers and steering input to determine whether the vehicle is turning to move into the other lane. As another example, the system can use cameras and other lane information to determine whether the vehicle is crossing into the other lane.

If these events are positive, the system activates the turn signals as illustrated at operation 684. If any of these events are negative, the system does not activate the turn signal at operation 674. In either event, the system continues monitoring sensor input at operation 686. Although this example illustrates four events that are checked, and all four events must be positive for turn signal actuation to occur, other embodiments can use fewer or greater than four events to make the determination. Additionally, other embodiments can be implemented that do not require all four events to be positive for the turn signal to be activated. For example, in one embodiment, even if the results of operations 676, 678, and 680 are negative, the system may still activate the turn signal if operation 682 is positive indicating the vehicle is changing lanes. This can account for a scenario, for example, in which the rate at which the host vehicle is closing on the other vehicle does not indicate that a passing event is going to occur, but lane change information to us. As another example, even if the lane is not clear, the driver may still be attempting to pass as indicated by lane change information at operation 682. While this might not be a safe time to pass, if the driver is still attempting to do so, the system can still activate the turn signals.

Although not illustrated, the turn-signal activation system can also activate other vehicle systems in addition to turn signals. For example, if the system detects by the sensors in unsafe condition or to an accident is imminent, the system can take action such as pre-tensioning the seatbelts, alerting the driver of the impending danger, applying the vehicle brakes to halt the vehicle, engaging the vehicle headlights were born to alert other drivers, and so on.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in Figure QRS. Various embodiments are described in terms of this example-computing system 700. After reading this description, it will become apparent to a person skilled in the relevant art how to implement the technology using other computing systems or architectures.

Figure 10:
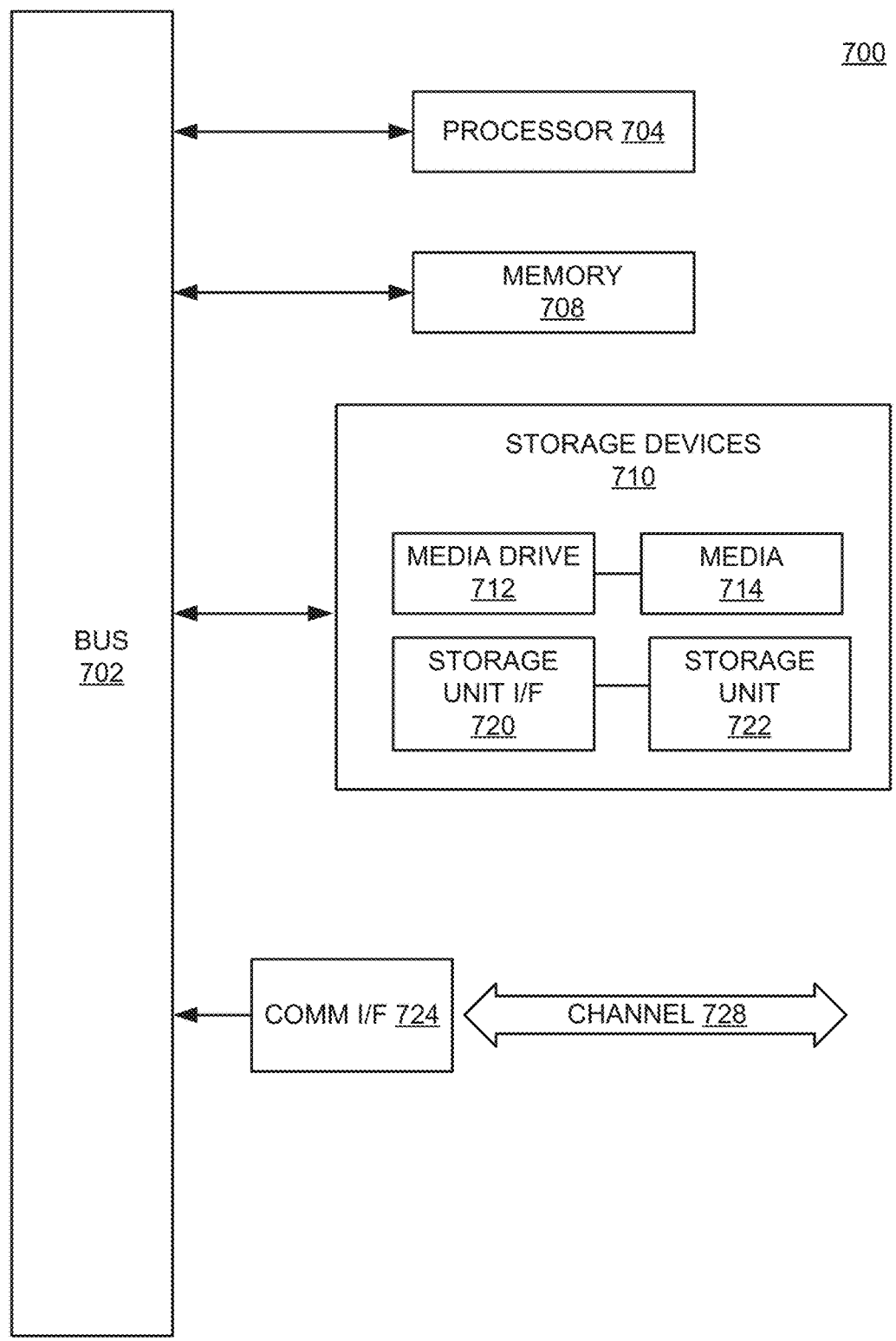
FIG. 10 illustrates an example computing system that may be used in implementing various features of embodiments of the disclosed technology.

Referring now to FIG. 10, computing system 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing system 700 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 700 might include, for example, one or more processors, controllers, control modules, or other processing devices, such as a processor 704. Processor 704 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 704 is connected to a bus 702, although any communication medium can be used to facilitate interaction with other components of computing system 700 or to communicate externally.

Computing system 700 might also include one or more memory modules, simply referred to herein as main memory 708. For example, in some embodiments random access memory (RAM) or other dynamic memory, might be used for storing information and instructions to be executed by processor 704. Main memory 708 might also be used for storing temporary variables or other intermediate information during execution of instructions to be executed by processor 704. Computing system 700 might likewise include a read only memory ("ROM") or other static storage device coupled to bus 702 for storing static information and instructions for processor 704.

The computing system 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), a flash drive, or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing system 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a flash drive and associated slot (for example, a USB drive), a PCMCIA slot and card, and other fixed or removable storage units 722 and interfaces 720 that allow software and data to be transferred from the storage unit 722 to computing system 700.

Computing system 700 might also include a communications interface 724. Communications interface 724 might be used to allow software and data to be transferred between computing system 700 and external devices. Examples of communications interface 724 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A turn signal modulation system for controlling turn signals of a host vehicle comprising a turn signal system, the turn signal modulation system comprising:
   a vehicle braking sensor;
   a vehicle attitude sensor; and
   a turn signal modulation circuit, comprising:
      a communication receiver, communicatively coupled to receive information from at least the vehicle braking sensor and the vehicle attitude sensor;
      a decision circuit comprising an input communicatively coupled to receive sensor information from the communication receiver, wherein the sensor information comprises information indicating whether the vehicle is in a turn lane of an intersection, an amount of braking force applied to the host vehicle and information indicating changes in vehicle attitude, and wherein the decision circuit is configured to actuate the turn signals if the vehicle is in a turn lane of the intersection and based on the amount of braking force applied to the host vehicle and the change in vehicle attitude; and
      a transmitter communicatively coupled to send turn signal actuation instructions to the turn signal system.

2. The turn signal modulation system of claim 1, wherein a vehicle braking sensor comprises at least one of a sensor to determine an amount of braking force is being applied to brakes of the vehicle, and an accelerometer to determine a magnitude of deceleration experienced by the host vehicle.

3. The turn signal modulation system of claim 1, wherein the vehicle attitude sensor comprises a steering input sensor to detect an amount of steering input being applied by a driver of the host vehicle.

4. The turn signal modulation system of 3, wherein the steering input sensor comprises a rotational encoder.

5. The turn signal modulation system of claim 1, wherein the vehicle attitude sensor comprises an accelerometer to detect a change in yaw of the vehicle.

6. A method for turn signal modulation, comprising:
   a plurality of vehicle sensors sensing information about a vehicle and transmitting that information to a turn signal modulation circuit;
   the turn signal modulation circuit receiving information from the vehicle sensors;
   the turn signal modulation circuit determining whether the vehicle is in a turn lane of an intersection;
   the turn signal modulation circuit determining whether brakes of the vehicle are being applied above a threshold amount of brake application;
   the turn signal modulation circuit determining whether a vehicle attitude change is greater than a determined threshold; and
   if the vehicle is in a turn lane of the intersection, if the brakes of the vehicle are being applied above a threshold braking amount, and if the vehicle attitude change is greater than a determined attitude threshold, the turn signal modulation circuit transmitting a signal to a turn signal system of the vehicle to activate the turn signals.

7. The method of claim 6, wherein determining whether a vehicle attitude change is greater than a determined threshold comprises determining whether the vehicle steering wheel is rotated greater than a threshold amount.

8. The method of claim 7, wherein rotational encoders disposed on a steering column are used to determine the amount of rotation of the steering wheel.

9. The method of claim 6, wherein determining whether a vehicle attitude change is greater than a determined threshold comprises determining whether the vehicle is undergoing a yaw event by a degree of yaw greater than a threshold amount.

10. The method of claim 6, further comprising the turn signal modulation circuit determining whether the vehicle is approaching a turn lane at an intersection.

11. A method for turn signal modulation, comprising:
   a plurality of vehicle sensors sensing information about a vehicle and transmitting that information to a turn signal modulation circuit, the sensed information including at least braking information indicating an amount of braking force being applied to the vehicle;
   the turn signal modulation circuit receiving information from the vehicle sensors;

the turn signal modulation circuit determining whether the vehicle is in a turn lane of an intersection using sensor information received from the vehicle sensors;

the turn signal modulation circuit activating turn signals of the vehicle if the vehicle is in a turn lane of the intersection and the braking information indicates that the amount of braking being applied to the vehicle exceeds a braking threshold.

12. The method of claim 11, further comprising the turn signal modulation circuit determining whether the vehicle is approaching an intersection.

13. The method of claim 11, further comprising the turn signal modulation circuit determining whether the vehicle is in a right turn lane or a left turn lane of the intersection.

14. The method of claim 13 further comprising the turn signal modulation circuit activating the right turn signal of the vehicle if the turn signal modulation circuit determines that the vehicle is in the right turn lane, and the left turn signal of the vehicle if the turn signal modulation circuit determines that the vehicle is in the left turn lane.

* * * * *